US009964205B2

(12) United States Patent
Miyamoto

(10) Patent No.: US 9,964,205 B2
(45) Date of Patent: May 8, 2018

(54) CONTROLLER AND CONTROL METHOD FOR ELECTRIC OIL PUMP

(71) Applicant: Hitachi Automotive Systems, Ltd., Hitachinaka-shi, Ibaraki (JP)

(72) Inventor: Shogo Miyamoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days. days.

(21) Appl. No.: 15/119,555

(22) PCT Filed: Sep. 19, 2014

(86) PCT No.: PCT/JP2014/074956
§ 371 (c)(1),
(2) Date: Aug. 17, 2016

(87) PCT Pub. No.: WO2015/136749
PCT Pub. Date: Sep. 17, 2015

(65) Prior Publication Data
US 2017/0211688 A1    Jul. 27, 2017

(30) Foreign Application Priority Data

Mar. 14, 2014  (JP) .................................. 2014-051218

(51) Int. Cl.
*F16H 61/00*  (2006.01)
*F16H 61/662*  (2006.01)
(52) U.S. Cl.
CPC ....... *F16H 61/0031* (2013.01); *F16H 61/662* (2013.01)
(58) Field of Classification Search
CPC ........................... F16H 61/0031; F16H 61/662
See application file for complete search history.

(56) References Cited

U.S. PATENT DOCUMENTS 9,074,596 B2 *  7/2015  Miyamoto ............... F04B 49/20
9,239,306 B2 *  1/2016  Okamoto ............... H02H 7/093
(Continued)

FOREIGN PATENT DOCUMENTS

CN  102403935 A  4/2012
CN  102691649 A  9/2012
(Continued)

OTHER PUBLICATIONS

International Preliminary Report on Patentability (PCT/IB/326, PCT/IB/338 & PCT/IB/373) issued in PCT Application No. PCT/JP2014/074956 dated Sep. 22, 2016, including English translation of document C2 (Japanese-language Written Opinion (PCT/ISA/237)) previously filed on Aug. 17, 2016 (9 pages).
(Continued)

*Primary Examiner* — Ramya P Burgess
*Assistant Examiner* — David R Morris
(74) *Attorney, Agent, or Firm* — Crowell & Morning LLP

(57)            ABSTRACT

An electric oil pump (ELOP) provided in parallel to a mechanical oil pump driven by an engine supplies oil to a clutch of a transmission. The ELOP is rotated in advance of a request to operate the ELOP at a targeted relatively-low first preoperation rotational speed. When an actual rotational speed matches the first preoperation rotational speed and an actual current matches a threshold, the ELOP is rotated at a targeted relatively-high second preoperation rotational speed. At least when an actual rotational speed matches a second predetermined rotational speed not higher than the second preoperation rotational speed, it is determined that preoperation is completed. If the number of restarts during the preoperation as one operation history of the ELOP reaches or exceeds the predetermined number of times, the current supply to the ELOP is interrupted to limit the restart, (Continued)

thereby reducing the number of repeated restarts of the ELOP.

15 Claims, 7 Drawing Sheets

(56) References Cited

U.S. PATENT DOCUMENTS

| | | | |
|---|---|---|---|
| 2011/0135499 A1* | 6/2011 | Lee | F04B 49/06 417/44.1 |
| 2012/0063922 A1 | 3/2012 | Sano et al. | |
| 2012/0244012 A1 | 9/2012 | Kigure | |
| 2012/0245820 A1 | 9/2012 | Miyamoto | |
| 2013/0078111 A1 | 3/2013 | Okamoto | |
| 2013/0238147 A1 | 9/2013 | Okamoto | |
| 2013/0319366 A1 | 12/2013 | Karasawa | |

FOREIGN PATENT DOCUMENTS

| | | |
|---|---|---|
| CN | 102691650 A | 9/2012 |
| CN | 103016170 A | 4/2013 |
| CN | 103370503 A | 10/2013 |
| JP | 10-332023 A | 12/1998 |
| JP | 2008-8282 A | 1/2008 |
| JP | 2012-57645 A | 3/2012 |
| JP | 2012-197842 A | 10/2012 |
| JP | 2012-197843 A | 10/2012 |
| JP | 2013-67326 A | 4/2013 |
| JP | 2013-68267 A | 4/2013 |
| JP | 2013-170624 A | 9/2013 |
| JP | 2013-185497 A | 9/2013 |

OTHER PUBLICATIONS

International Search Report (PCT/ISA/210) issued in PCT Application No. PCT/JP2014/074956 dated Dec. 22, 2014 with English translation (Four (4) pages).
Japanese-language Written Opinion (PCT/ISA/237) issued in PCT Application No. PCT/JP2014/074956 dated Dec. 22, 2014 (Four (4) pages).
Chinese-language Office Action issued in counterpart Chinese Application No. 201480077189.2 dated Apr. 25, 2017 with English translation (Twenty-Two (22) pages).
Japanese Office Action issued in counterpart Japanese Application No. 2014-051218 dated Jul. 4, 2017 with unverified partial English translation (eight pages).
Extended European Search Report issued in counterpart European Application No. 14885412.8 dated Jan. 17, 2018 (Seven (7) pages).

* cited by examiner

CONTROLLER AND CONTROL METHOD FOR ELECTRIC OIL PUMP

TECHNICAL FIELD

The present invention relates to a controller for an electric oil pump for use in a vehicle and a control method therefor.

BACKGROUND ART

A conventional electric oil pump is provided in parallel to a mechanical oil pump driven by an internal combustion engine as a power source of a vehicle to thereby supply oil to a transmission of the vehicle. The electric oil pump supplies lubricating/cooling oil to at least a part (clutch) of the transmission as needed in response to an operation request.

In some cases, however, when the electric oil pump configured to operate in response to the operation request is stopped, oil retains in an oil pipe controlled by the electric oil pump, whereby its temperature differs from oil in an oil pan that frequently flows by means of the mechanical oil pump. The oil retaining in the oil pipe controlled by the electric oil pump tends to lower the temperature and increase the viscosity. Thus, when operating the electric oil pump in this state, the motor might suffer from an excessive resistance and fail to respond to the operation request.

As a countermeasure against the above problem, the following technique has been known (see Patent Document 1). That is, in order to prepare for the operation in advance of the request to operate the electric oil pump, the electric oil pump is rotated at a target rotational speed set to a second preoperation rotational speed. At least when the actual rotational speed matches a predetermined rotational speed not higher than the second preoperation rotational speed, it is determined that the preoperation is completed. Under at least one condition that it is not yet determined that the preoperation is completed, the electric oil pump is rotated at the target rotational speed set to a first preoperation rotational speed lower than the second preoperation rotational speed and the predetermined rotational speed.

REFERENCE DOCUMENT LIST

Patent Document

Patent Document 1: JP 2013-170624 A

SUMMARY OF THE INVENTION

Problems to be Solved by the Invention

By the way, if the electric oil pump is incapable of normal rotation, for example, because current cannot be switchingly supplied to a target phase of the motor for driving the electric oil pump due to deviations or deteriorations in components or insufficient feeding voltage from an in-vehicle power supply, the power supply to the electric oil pump is suspended. Then, the target rotational speed is reset to restart the rotating operation. Such restart is repeatedly carried out in some cases, However, repeating the restart increases current at an extremely low temperature at which the preoperation is performed. Hence, there are possibilities of considerably increasing power consumption and reducing heat resistance (service life) of the electric oil pump due to high heat generation.

In particular, if the motor for driving the electric oil pump is operated in a sensorless manner, i.e., without any positional sensor, it is necessary to perform positioning control on a rotor for identifying the initial position thereof along with the restart. During the positioning control on the rotor, current flowing in the electric oil pump is too large to ignore from the viewpoints of power saving and thermal protection of the electric oil pump. Hence, it is unpreferable to repeat the restart too many times.

In view of some of the above problems, the present invention has been accomplished and an object of the present invention is to provide a controller and control method for an electric oil pump, which can reduce the number of repeated restarts of the electric oil pump.

Means for Solving the Problems

To attain the above object, the present invention provides a controller for an electric oil pump which is provided in parallel to a mechanical oil pump driven by an internal combustion engine as a power source of a vehicle to supply oil to a transmission for the vehicle, and which is configured to supply oil to at least a part of the transmission, the controller comprising: a determination unit configured to implement a determination mode in which the electric oil pump is rotated in advance of a request to operate the electric oil pump at a target rotational speed set to a second preoperation rotational speed, and at least when an actual rotational speed matches a second predetermined rotational speed not higher than the second preoperation rotational speed, it is determined that preoperation for the electric oil pump is completed; and a preoperation unit configured to implement a preoperation mode in which, under at least one condition that it is not yet determined that preoperation for the electric oil pump is completed, the electric oil pump is rotated at the target rotational speed set to a first preoperation rotational speed lower than the second preoperation rotational speed and the second predetermined rotational speed, and also configured to shift the preoperation mode to the determination mode when an actual rotational speed matches the first preoperation rotational speed and an actual current matches a predetermined threshold, wherein the preoperation unit is configured to limit restart of the electric oil pump according to an operation history of the electric oil pump.

In addition, the present invention provides a control method for an electric oil pump which is provided in parallel to a mechanical oil pump driven by an internal combustion engine as a power source of a vehicle to supply oil to a transmission for a vehicle, and which is configured to supply oil to at least a part of the transmission, the method comprising, under control of a control unit, the steps of: implementing a determination mode in which the electric oil pump is rotated in advance of a request to operate the electric oil pump at a target rotational speed set to a second preoperation rotational speed, and at least when an actual rotational speed matches a second predetermined rotational speed not higher than the second preoperation rotational speed, it is determined that preoperation for the electric oil pump is completed; implementing a preoperation mode in which, under at least one condition that it is not yet determined that preoperation for the electric oil pump is completed, the electric oil pump is rotated at the target rotational speed set to a first preoperation rotational speed lower than the second preoperation rotational speed and the second predetermined rotational speed, and also shifting the preoperation mode to the determination mode when an actual rotational speed matches the first preoperation rotational speed and an actual current matches a predetermined threshold; and limiting, in the preoperation mode, restart of the electric oil pump according to an operation history of the electric oil pump.

Effects of the Invention

The controller for an electric oil pump according to the present invention can reduce the number of repeated restarts of the electric oil pump and thus save power consumption and suppress reduction in heat resistance (service life) of the electric oil pump, which might occur with high heat generation.

MODES FOR CARRYING OUT THE INVENTION

Hereinafter, embodiments of the present invention will be described in detail.

Figure 1:
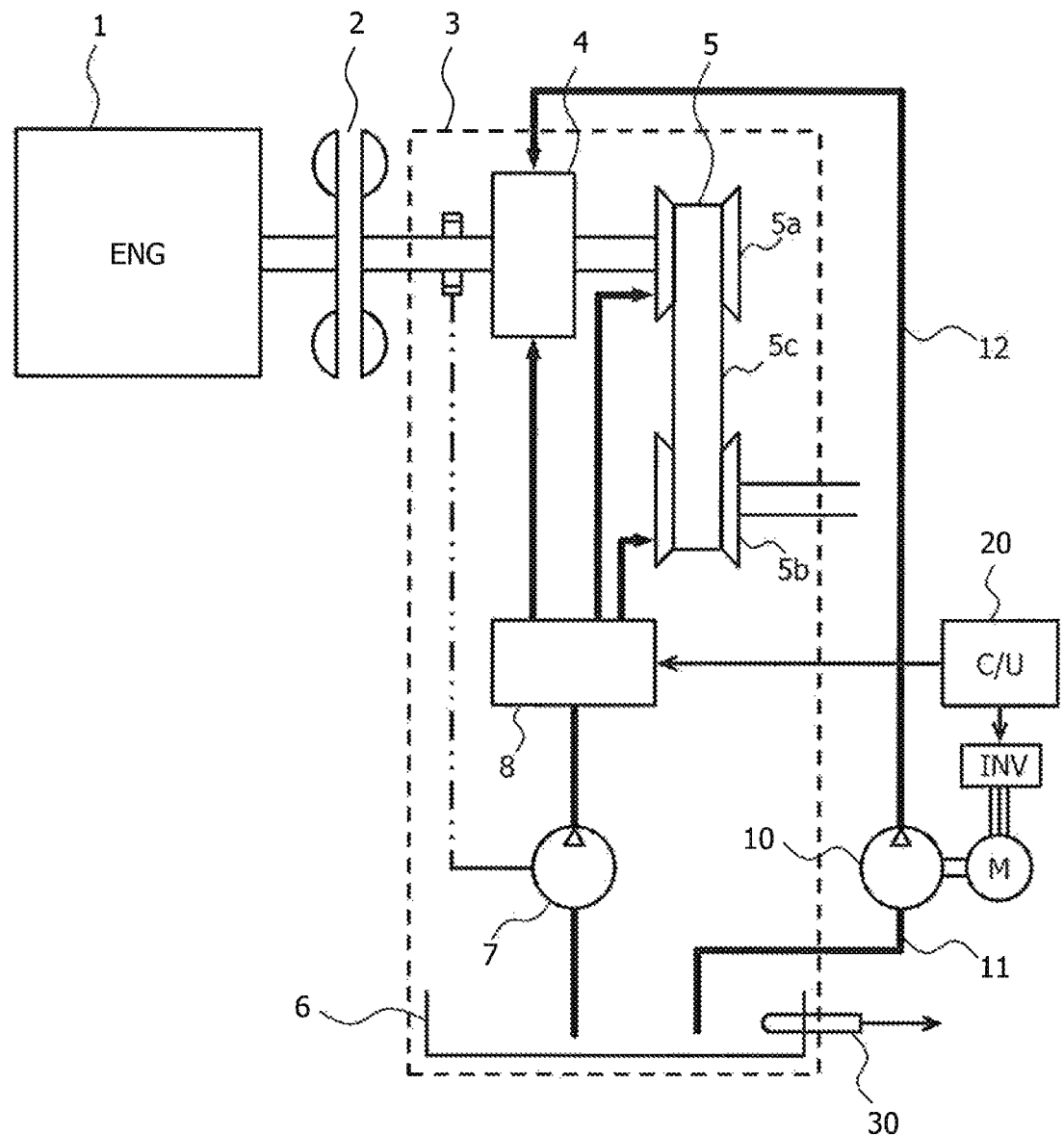
FIG. 1 is a schematic diagram illustrating an oil supply system in a transmission for a vehicle according to an embodiment of the present invention.

FIG. 1 is a schematic diagram illustrating an oil supply system in a transmission for a vehicle according to an embodiment of the present invention.

An engine (internal combustion engine) 1 as a power source of the vehicle has an idle reduction function. Under the predetermined idle reduction condition, fuel supply to engine 1 is interrupted to thereby automatically stop engine 1. After that, if the condition for cancelling idle reduction is satisfied, the fuel supply to engine 1 is resumed to thereby restart engine 1.

An output shaft of engine 1 is connected to a transmission 3 by way of a torque converter 2.

Transmission 3 is composed of a clutch 4 and a continuously variable transmission unit 5. Clutch 4 is made up of a multiplate wet clutch, and its engagement/disengagement is controlled according to the oil pressure of the hydraulic oil.

More specifically, in this example, clutch 4 refers to a frictional engagement element in an advancing/backing changeover mechanism. The advancing/backing changeover mechanism includes, for example, a planetary gear mechanism composed of a ring gear connected with the output shaft of the engine, a pinion, and a pinion carrier, and a sun gear connected with the input shaft of the transmission unit, a backing brake serving to fix a transmission unit case to the pinion carrier, and a forward clutch serving to connect the transmission unit input shaft to the pinion carrier. The advancing/backing changeover mechanism switches the forward/backward movement of the vehicle. In this case, the forward clutch and the backing brake as the frictional engagement elements in the advancing/backing changeover mechanism constitute clutch 4.

Continuously variable transmission unit 5 includes a primary pulley 5a, a secondary pulley 5b, and a belt 5c stretched between these pulleys. The rotational force of primary pulley 5a is transmitted to secondary pulley 5b by way of belt 5c, and the rotational force of secondary pulley 5b is transmitted to an unillustrated driven wheel.

In continuously variable transmission unit 5, movable conical plates of primary pulley 5a and secondary pulley 5b are moved in the axial direction by controlling the oil pressure of the hydraulic oil. By changing the contact radius between pulleys 5a and 5b and belt 5c, the pulley ratio (speed ratio) is changed between primary pulley 5a and secondary pulley 5b, making it possible to continuously change the transmission gear ratio.

The oil retains in an oil pan 6 at the bottom of the case for transmission 3. The oil is pumped and pressurized by a mechanical oil pump 7 and then supplied, as a hydraulic oil, to clutch 4 and a hydraulic actuator of respective pulleys 5a and 5b by means of a pressure adjusting mechanism 8.

Mechanical oil pump 7 is disposed in the case for transmission 3 and driven by the input shaft of transmission 3. Therefore, mechanical oil pump 7 is substantially driven by engine 1 as a power source.

In pressure adjusting mechanism 8, an electromagnetic valve having a relief function is provided to each supply unit (clutch 4 and pulleys 5a, 5b). Under the control of a control unit (CIU) 20 composed of a microcomputer, a discharge pressure of mechanical oil pump 7 is adjusted to a target pressure for each supply unit and then supplied to the supply units. As a result, the forward/backward movement of the vehicle is switched and the transmission gear ratio is controlled.

Mechanical oil pump 7 supplies oil as a hydraulic oil to clutch 4 and pulleys 5a, 5b by means of pressure adjusting mechanism 8 and in addition, supplies lubricating/cooling oil to each part of transmission 3. The supplied oil is returned to oil pan 6 and circulated.

On the other hand, an electric oil pump 10 is provided in parallel to mechanical oil pump 7 driven by engine 1 as a power source.

Electric oil pump 10 is disposed to supply lubricating/cooling oil to clutch 4 in order to suppress the generation of frictional heat in clutch 4 at the time of stopping engine 1, i.e., at the time of stopping mechanical oil pump 7.

Figure 2:
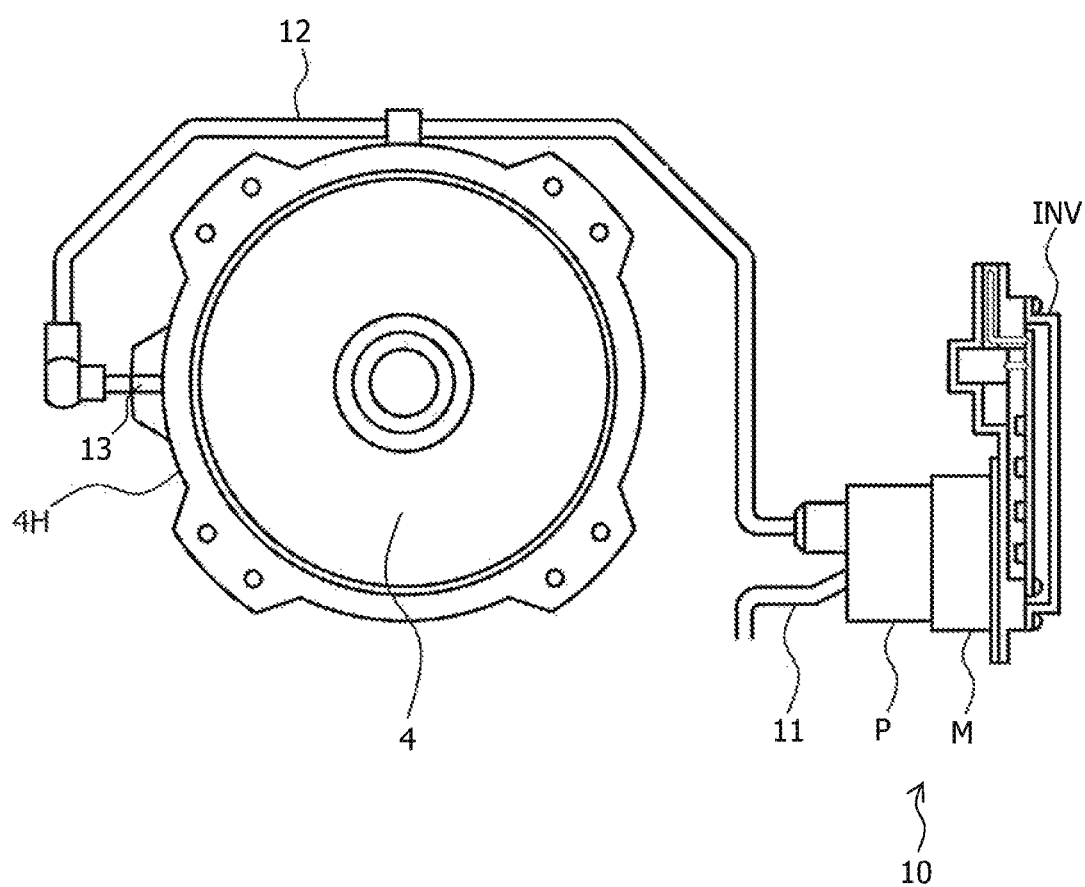
FIG. 2 is a schematic diagram illustrating an example of the layout for an electric oil pump and an oil pipe thereof.

FIG. 2 illustrates an example of the layout of the electric oil pump and an oil pipe thereof. Referring to FIGS. 1 and 2, a detailed description is given below.

Electric oil pump 10 is composed of a pump unit P, a motor M for driving pump unit P, and an inverter INV that executes pulse width modulation (PWM) control over motor M under the control of control unit 20.

Moreover, electric oil pump 10 is provided outside the case for transmission 3 and configured to pump oil from oil pan 6 at the bottom of the case via an intake pipe 11 and supply cooling oil to clutch 4 in the case via a discharge pipe 12. Therefore, discharge pipe 12 is routed around the case for transmission 3, that is, around a housing 4H of clutch 4 and then connected to an oil inlet 13 formed in housing 4H.

Housing 4H incorporates an oil path (unillustrated) through which oil is led from oil inlet 13 to a central portion of the housing. The oil led to the central portion of the housing is centrifugally fed to the respective units.

Figure 3:
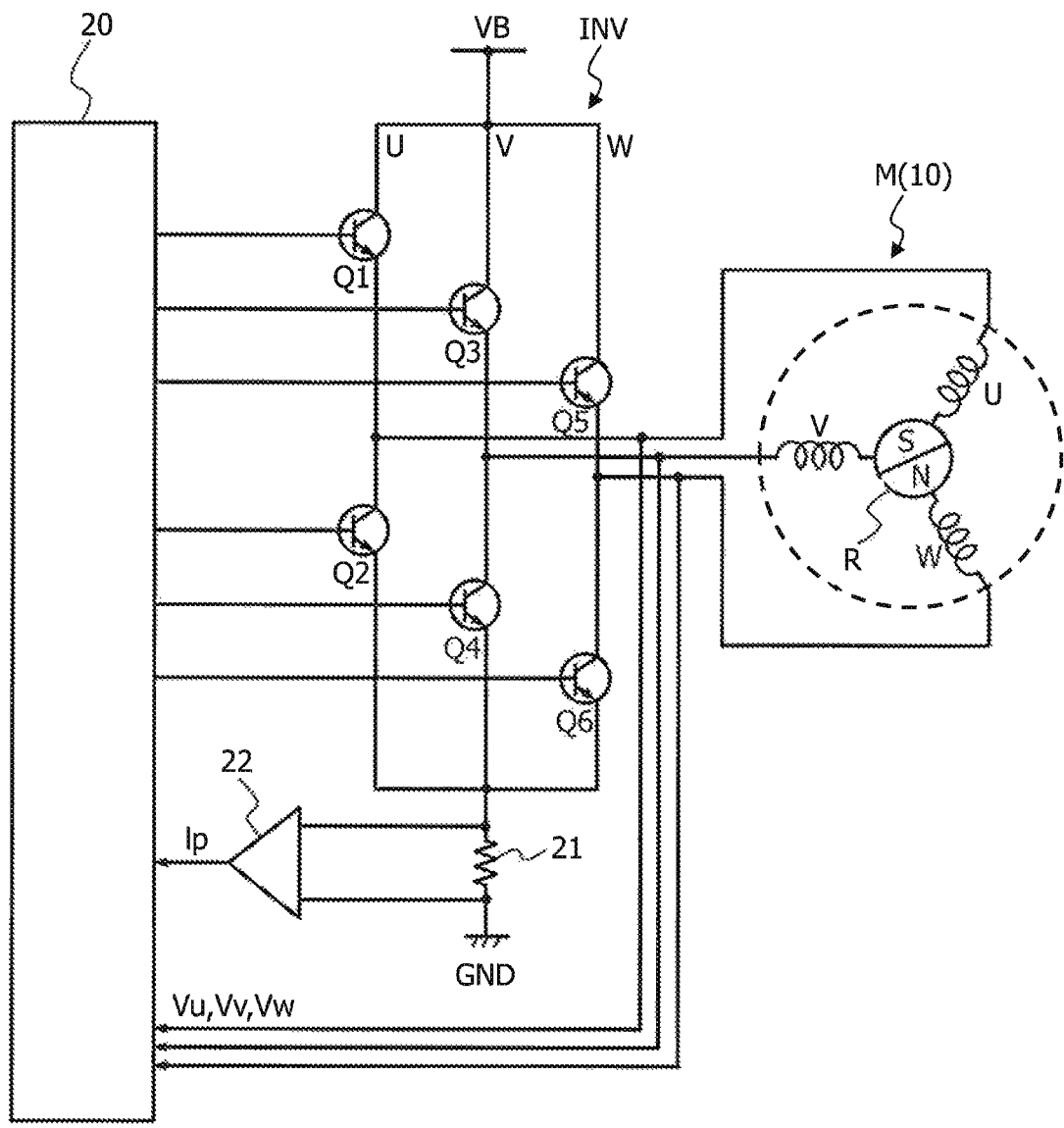
FIG. 3 is a circuit diagram illustrating a motor and an inverter, which constitute the electric oil pump.

FIG. 3 is a circuit diagram of motor M and inverter INV which constitute electric oil pump 10.

A three-phase brushless motor is adopted as motor M. The motor is composed of an inner rotor R attached to the rotational shaft with plural permanent magnets embedded therein, and an outer stator (unillustrated) around which three-phase (U-phase, V-phase, and W-phase) coils are wound. Rotor R is rotated by utilizing the magnetic field generated by a current supplied to the stator coil.

Inverter INV undergoes PWM control (control for generating a voltage with the pulse width modulated at predetermined intervals so as to approximate the sinusoidal waveform) to thereby convert a power supply voltage (DC voltage) to an AC voltage and apply the converted voltage to motor M. A U-phase arm, a V-phase arm, and a W-phase arm are provided in parallel between the power supply VB and the ground GND.

The U-phase arm includes two switching elements Q1, Q2 connected in series. The V-phase arm also includes two switching elements Q3, Q4 connected in series. The W-phase arm includes two switching elements Q5, Q6 connected in series as well.

The U-, V-, and W-phase coils have one ends star-connected in motor M and the other ends connected to the midpoints of the U-, V-, and W-phase arms, respectively. In other words, the midpoint between switching elements Q1, Q2 of the U-phase arm is connected to the U-phase coil. The midpoint between switching elements Q3, Q4 of the V-phase arm is connected to a V-phase coil. The midpoint between switching elements Q5, Q6 of the W-phase arm is connected to the W-phase coil.

Accordingly, control unit 20 controls a ratio between an ON period of the switching element for each phase arm on the power supply VB side and an ON period for the switching element for each phase arm on the ground GND side according to the sinusoidal voltage to be applied to each of the U-, V-, and W-phases. Thus, a pseudo AC voltage can be obtained to drive motor M. That is, control unit 20 constitutes a controller for electric oil pump 10.

Note that in order to control the drive of motor M, control unit 20 receives, by way of a detector 22, a signal indicative of a potential difference $\Delta V$ between both ends of a current measurement resistor (resistance value R) 21 provided on a common line of the U-, V-, and W-phase arms on the ground GND side. A pump current $I_p(=\Delta V/R)$ is measured based on the potential difference. In addition, potentials Vu, Vv, and Vw at the midpoints of the U-, V-, and W-phase arms are also measured and input thereto.

In the oil supply system of the thus-configured transmission for a vehicle, during operation of engine 1, mechanical oil pump 7 supplies oil to each part of transmission 3. As needed, an operation request is sent to electric oil pump 10 (that is, a drive command signal to motor M) and then, electric oil pump 10 supplies cooling oil to clutch 4 to thereby prevent the heat generation in clutch 4.

The operation request is sent to electric oil pump 10 under the following conditions:
(1) Engine 1 is stopped in an idle reduction mode, by which mechanical oil pump 7 is stopped.
(2) Regardless of whether mechanical oil pump 7 is operating/stopped, clutch 4 is manipulated, for example, at the time of starting the vehicle (in particular, clutch 4 slips when being engaged), that is, at the time when clutch 4 has to be cooled with high reliability.

As for electric oil pump 10, performance assurance oil temperature (for example, −25° C.) is preset, and the pump operation is guaranteed at the oil temperature equal to or higher than that value. Accordingly, if the temperature is less than the performance assurance oil temperature, it is desirable to avoid starting the vehicle as well as idle reduction not to issue any operation request to electric oil pump 10.

As a general means for measuring the oil temperature, oil temperature sensor 30 (see FIG. 1) is provided in oil pan 6. However, the oil temperature in the oil pipes (intake pipe 11 and discharge pipe 12) controlled by electric oil pump 10 might largely differ from that in oil pan 6.

This is because, when electric oil pump 10 is stopped, oil in oil pipes 11 and 12 controlled by electric oil pump 10 retains there and consequently, its temperature differs from the temperature of oil in oil pan 6, which frequently flows by means of mechanical oil pump 7.

Furthermore, in this embodiment, electric oil pump 10 is provided outside the case for transmission 3 and oil pipes 11 and 12 controlled by electric oil pump 10 are routed outside the case for transmission 3. Hence, even if the inner temperature of the case for transmission 3 increases during the warmup of engine 1 and transmission 3, electric oil pump 10 and oil pipes 11 and 12 thereof are still exposed to the outside air. Thus, in extremely cold climate in the winter season, these are left in the extremely cold environment.

Therefore, if a first request to operate the pump is issued during the warmup after the startup in the cold winter climate, oil in oil pipes 11 and 12 controlled by electric oil pump 10 shows high viscosity, by which motor M receives excessive load and thus fails to respond to the operation request in some cases.

In view of the above, in order to reliably assure the operation at a general rotational speed when an operation request is issued to electric oil pump 10, control unit 20 prepares for the operation of electric oil pump 10 in advance of the operation request. Such preoperation is carried out in a preoperation mode set in a preoperation unit and a determination mode set in a determination unit out of control unit 20.

First of all, control unit 20 sets, in the preoperation mode, a target rotational speed to an extremely low first preoperation rotational speed to rotate electric oil pump 10. That is, electric oil pump 10 is slowly rotated at the extremely low speed not to suffer from excessive load nor consume excessive power. Relatively warm oil in oil pan 6 is then supplied to oil pipes 11 and 12 and replaced with the oil in oil pipes 11 and 12. As a result, control unit 20 raises the oil temperature in oil pipes 11 and 12 and thus lowers the viscosity of the oil, making it possible to rotate electric oil pump 10 at high speed and suppress step-out of motor M. Then, control unit 20 promptly makes the positive determination on whether the preoperation is completed in the determination mode as described later. Thus, the preoperation time is reduced to realize quick response to a subsequent operation request.

The above preoperation mode is terminated only after the actual rotational speed of electric oil pump 10 becomes equal or close to the first preoperation rotational speed, and the mode can be shifted to the subsequent determination mode.

In the subsequent determination mode, in order to determine whether the oil in oil pipes 11 and 12 is replaced to thereby complete the preoperation, a target rotational speed is set to a relatively high second preoperation rotational speed to rotate electric oil pump 10. Then, if determined that the actual rotational speed can be kept higher than the lower limit of the rotational speed, which conforms to the performance assurance flow rate, it is determined that the preoperation is completed. Then, after it is determined that the preoperation is completed, electric oil pump 10 is allowed to operate. Hence, electric oil pump 10 receives no operation request in association with the idle reduction control, before the preoperation is completed.

Note that the preoperation mode and the determination mode are basically executed in the following order: (1) preoperation mode and (2) determination mode. If it is not determined that the preoperation is completed, these modes (1) and (2) are repeated in this order. However, the following can be executed instead. That is, if it is determined that the transmission 3 is not cooling down (i.e., warm-up is completed) by a means (oil temperature sensor 3) for determining whether transmission 3 is cooling down (or warm-up is completed), the determination mode is first performed at the relatively high speed. If not determined that the preoperation is completed, the preoperation mode is performed and then, the determination mode is performed again to thereby shorten the time necessary to prepare for the operation of electric oil pump 10.

Next referring to the flowcharts, a description is given of a processing routine for preparing for the operation of electric oil pump 10, which is executed by control unit 20.

Figure 4:
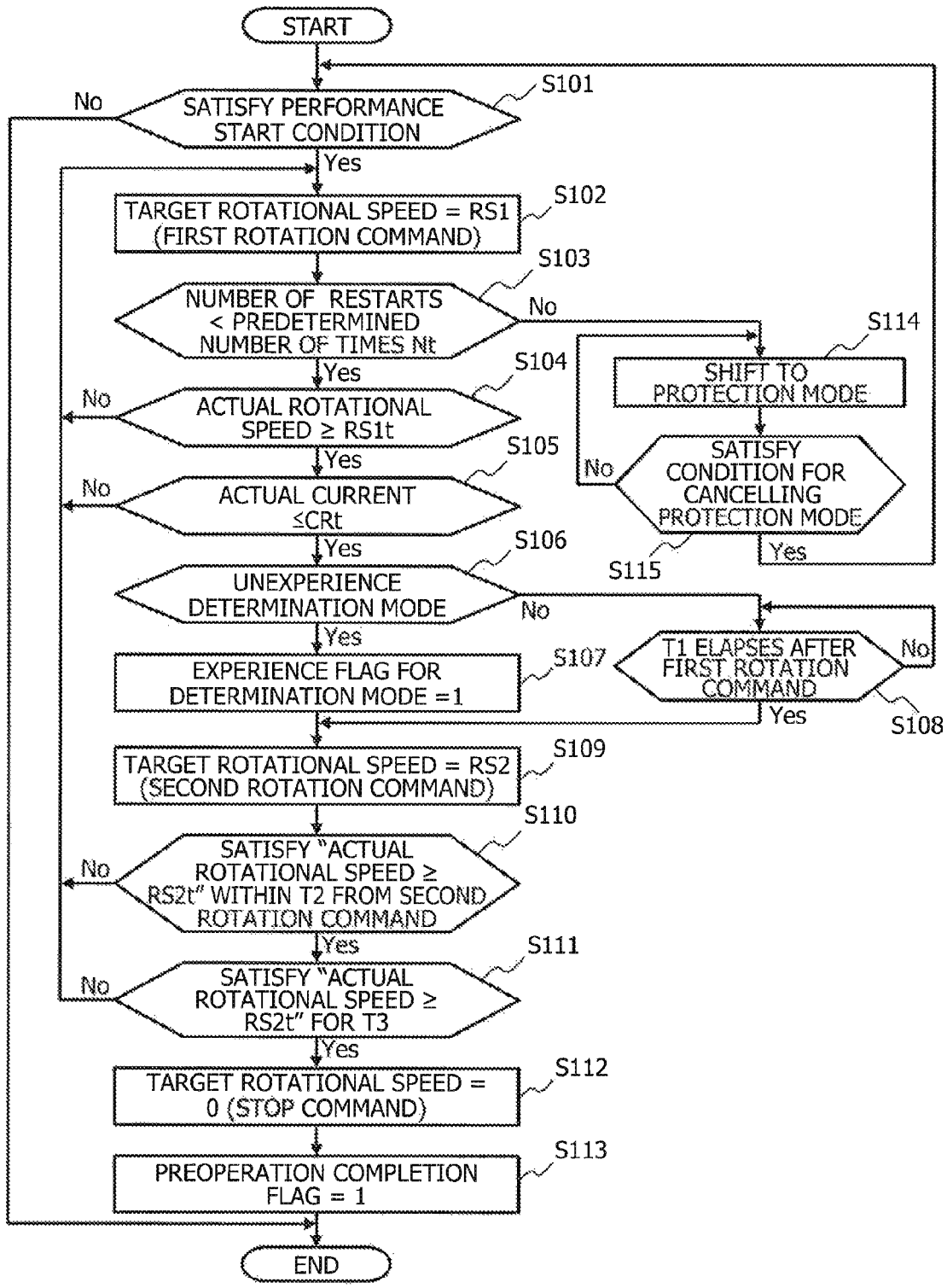
FIG. 4 is a flowchart illustrating a preoperation routine for an electric oil pump according to a first embodiment of the present invention.
Figure 5:
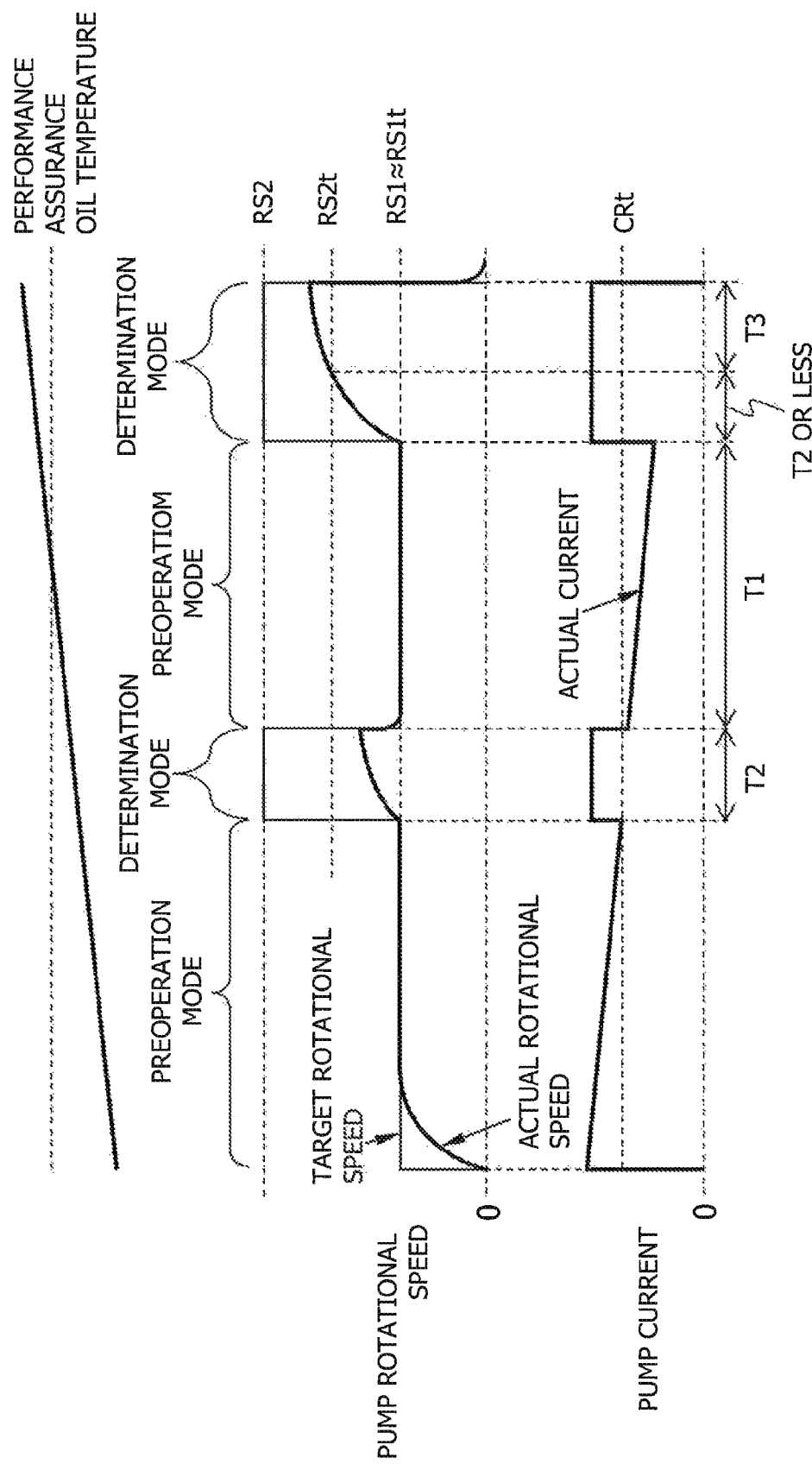
FIG. 5 is an explanatory view illustrating behaviors of an actual rotational speed, an actual current, etc. during the preoperation.

FIG. 4 is a flowchart illustrating a processing routine for preparing for the operation of electric oil pump 10 according to a first embodiment of the present invention. This processing routine is executed just after the power-on and thereafter is carried out at predetermined time intervals. Here, the routine might be performed if the current oil temperature is higher than the initial oil temperature (after confirming the rise in oil temperature) instead of performing the routine at predetermined time intervals (the same applies to the flowcharts of the processing according to second to fourth embodiments as described below). Furthermore, FIG. 5 illustrates behaviors of a pump rotational speed, etc. during the preoperation according to the first embodiment. Thus, the processing is described referring to FIG. 5 as well.

In step 101 (simply indicated by "S101" in the drawings, the same applies to the other steps), it is determined whether a predetermined condition for starting the preoperation is satisfied. The term "condition for starting the preoperation" basically refers to the condition that the preoperation for electric oil pump 10 is not completed after the power-on (preoperation completion flag=0). It also corresponds to the condition that, although preoperation completion flag=1, an operation request has not been sent to electric oil pump 10 for a predetermined time or more after the previous preoperation is completed, or the condition that a predetermined time or more has elapsed after the previous operation request is sent to electric oil pump 10 and also, the outside temperature measured by an outside temperature sensor is a predetermined value or lower.

If such condition for starting the preoperation is satisfied, the preoperation completion flag is reset as needed and then, the processing advances to step 102 to perform the preoperation (Yes). If the condition for starting the preoperation is not satisfied, the processing is terminated (No).

In step 102, in order to start the preoperation mode, a first rotation command is issued to set the target rotational speed for electric oil pump 10 to a first preoperation rotational speed RS1. The first preoperation rotational speed RS1 is set much lower than a second preoperation rotational speed (set equal to or higher than the rotational speed that conforms to the performance assurance flow rate) as described below. The speed RS1 is, for example, 450 rmp.

In step 103, it is determined whether the number of restarts of electric oil pump 10 is below a predetermined number of times Nt (whether the condition of "the number of restarts<predetermined number of times Nt" is satisfied).

Here, the restart implies a situation that if electric oil pump 10 (i.e., motor M) cannot normally rotate, for example, in case the current cannot be switchingly supplied to a target phase due to deviations or deteriorations of the parts or insufficient feeding voltage from the in-vehicle power supply, the control is executed to stop the power supply to motor M and then, set the target rotational speed again to thereby start the rotational operation. The number of restarts is counted at each restart during the preoperation for electric oil pump 10 and then memorized in an unillustrated writable memory provided in control unit 20.

Further, the predetermined number of times Nt refers to the upper limit of the number of restarts, which conforms to both or either of the condition that the temperature of each part of electric oil pump 10 does not increase up to an allowable level along with the restart and the condition that the power supply voltage of the in-vehicle power supply does not reduce down to the allowable lower limit of the voltage or less along with the restart.

The reason for determining whether the number of restarts is less than the predetermined number of times Nt is as follows.

That is, repeating the restart leads to large power consumption and reduction in heat resistance (service life) of electric oil pump 10 because of the increased heat generation. At the low temperature at which the preoperation for electric oil pump 10 is performed, the current increases and thus, the above problems become more conscious at such low temperature.

Especially, if motor M for driving electric oil pump 10 is operated in a sensorless manner, i.e., without any positional sensor, it is necessary to perform positioning control for rotor R so as to identify the initial position thereof along with the restart. However, during this positioning control on the rotor, current flows in a large amount that cannot be ignored in view of power saving and thermal protection of electric oil pump 10, even compared to general sensorless control. Therefore, it is undesirable to repeat the restart too many times.

Thus, in step 103, the number of restarts, as a kind of information on the operation history of electric oil pump 10, is monitored. The preoperation mode can be continued if the number of restarts matches a value at which the temperature of each part of electric oil pump 10 is not increased up to the allowable temperature or a value at which the power supply voltage of the in-vehicle power supply is reduced down to the allowable lower limit of the voltage or less.

In step 103, if the condition of "the number of restarts <predetermined number of times Nt" is satisfied, the processing advances to step 104 (Yes). On the other hand, if the condition of "the number of restarts <predetermined number of times Nt" is not satisfied, the number of restarts is reset and the processing advances to step 114 so as to protect electric oil pump 10 against heat and save power consumption (No).

In step 104, it is determined whether the condition of "the actual rotational speed≥predetermined rotational speed RS1$t$" is satisfied. In this example, the predetermined rotational speed RS1$t$ is equal or close to the first preoperation rotational speed RS1. By determining whether the condition of "the actual rotational speed<predetermined rotational speed RS1t" is satisfied, it is possible to prevent such situation that, although electric oil pump 10 does not function well in the preoperation mode, the processing shifts to the determination mode and the erroneous determination is made. The above enhances the reliability of determination as to whether the preoperation is completed in the determination mode.

For example, under the condition that the oil temperature is −40° C., if a command to rotate for a predetermined time is issued to shift the preoperation mode to the determination mode (high rotational speed) even though the electric oil pump 10 does not rotate well, electric oil pump 10 is idling without pumping oil. This causes erroneous determination. If the preoperation is completed based on such erroneous determination, the flow rate falls below the target value. To overcome the above problem, after confirming that the predetermined rotational speed RS1t is obtained in the preoperation mode, the preoperation mode is shifted to the determination mode (relatively high rotational speed), thereby reducing the possibility of erroneous determination.

If the determination result in step 104 shows that actual rotational speed <predetermined rotational speed RS1t, the control unit follows the first rotation command. If the determination result shows the actual rotational speed pre-determined rotational speed RS1t (that is, first preoperation rotational speed RS1 is obtained), the processing advances to step 105 at once (Yes). On the other hand, the condition of "the actual rotational speed<predetermined rotational speed RS1t" is not satisfied, the processing returns to step 102 (No).

In step 105, the actual current of electric oil pump 10 is measured and it is determined whether the current matches a predetermined threshold CRt or less. Instead of simply determining whether the actual current threshold CRt, it is more preferable to first confirm whether the pump has experienced such a situation that "actual current>threshold CRt", and then confirm whether the pump current threshold.

Figure 6:
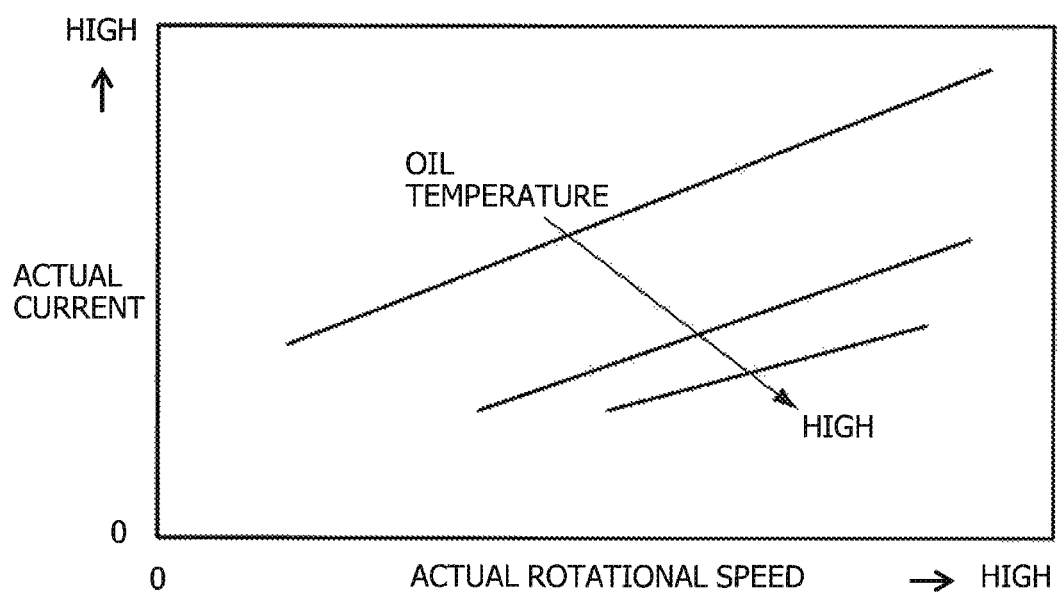
FIG. 6 is a characteristics chart of a pump current.

The reason for determining whether the current matches the predetermined threshold CRt or less is as follows. As illustrated in FIG. 6, if the actual rotational speed of electric oil pump 10 is constant (for example, first preoperation rotational speed RS1), the load on electric oil pump 10 decreases as the oil viscosity decreases due to the raised oil temperature. As a result, the actual current of electric oil pump 10 is decreased. Therefore, if it is determined that the actual current of electric oil pump 10 is reduced down to the predetermined threshold CRt or less in step 105, the pump might afford to undergo the determination mode (relatively high rotational speed). Thus, the pump available for the next mode is allowed to shift to the determination mode (relatively high rotational speed), thereby enhancing the reliability of determination as to whether the preoperation is completed in the determination mode.

If the determination result in step 105 shows the actual current >threshold CRt, the processing returns to step 102 to follow the first rotation command (No). If the determination result shows the actual current threshold CRt, the processing advances to step 106 at once (Yes).

In step 106, it is determined whether the pump has experienced the determination mode in steps 109 to step 111. Whether the pump has experienced the determination mode can be determined based on a value of an experience flag indicating that the pump has experienced the determination mode. The experience flag is set after executing the processing in subsequent step 107. If the pump has not experienced the determination mode, the processing advances to step 107 (Yes). On the other hand, if the pump has experienced the determination mode (failed to pass the previous one), the processing advances to step 108 to follow the first rotation command so that the oil temperature can rise up to the level enough to satisfy the condition that the preoperation is completed in the determination mode, and the oil condition can be improved (No).

In step 107, the flag indicating that the pump has experienced the determination mode is set (for example, switched from 0 to 1). In step 108, it is determined whether a predetermined time T1 (for example, 10 seconds) has elapsed from when the first rotation command is issued. The processing advances to step 109 just after the predetermined time T1 has elapsed (Yes). If the predetermined time T1 has not elapsed, the processing in step 108 is repeated (No).

In step 109, a second rotation command is issued to set the target rotational speed for electric oil pump 10 to the second preoperation rotational speed RS2 so as to start the determination mode. The second preoperation rotational speed RS2 is set equal to or higher than the rotational speed that conforms to the performance assurance flow rate. The speed RS2 is much higher than the first preoperation rotational speed RS1, for example, 2500 rmp.

In step 110, it is determined whether the condition of "the actual rotational speed predetermined rotational speed RS2t" is satisfied, within a predetermined time T2 after the second rotation command is issued. In this example, the predetermined rotational speed RS2t is lower than the second preoperation rotational speed RS2 and higher than the first preoperation rotational speed RS1, and also equal to the lower limit of the rotational speed that conforms to the performance assurance flow rate. The speed RS2t is, for example, 800 rmp. If the determination result shows that the condition of "actual rotational speed predetermined rotational speed RS2t" is satisfied within the predetermined time T2, the processing advances to step 111 at once (Yes). On the other hand, if the condition of "actual rotational speed≥predetermined rotational speed RS2t" is not satisfied even after the elapse of the predetermined time T2, the processing returns to step 102 after the elapse of time T2 (No).

In step 111, it is determined whether, after the condition of "actual rotational speed≥predetermined rotational speed RS2t" is satisfied, this condition is still satisfied for a predetermined time T3. If the determination result shows that the condition of "actual rotational speed predetermined rotational speed RS2t" is satisfied for the predetermined time T3, the processing advances to step 112 just after the elapse of time T3 (Yes). If the condition of "actual rotational speed predetermined rotational speed RS2t" is not satisfied for the time T3, the processing returns to step 102 at the time when the actual rotational speed falls below the predetermined rotational speed RS2t (No).

As described above, in the determination mode, after the second rotation command is sent so as to rotate the pump at the target rotational speed set to the second preoperation rotational speed RS2, in steps 110 and 111, if the actual rotational speed reaches the predetermined rotational speed RS2t within the predetermined time T2 and the condition of "actual rotational speed≥predetermined rotational speed RS2t" is satisfied for the predetermined time T3, the electric oil pump 10 might afford the performance assurance flow rate. Then, the processing advances to steps 112 and 113.

On the other hand, in the determination mode, as described above, if the determination result in step 110 shows that the condition of "actual rotational speed predetermined rotational speed RS2t" is not satisfied even after the elapse of the predetermined time T2 from when the second rotation command is issued, or the determination result in step 111 shows that the condition of "actual rotational speed≥predetermined rotational speed RS2*t*" cannot be satisfied for the predetermined time T3, the processing returns to step 102 in either case. That is, the preoperation mode (step 102 to step 106 and step 108) in which the target rotational speed is set to the relatively low first preoperation rotational speed RS1 is executed again. Then, after a while, the determination mode (step 109 to step 111) in which the target rotational speed is set to the relatively high second preoperation rotational speed RS2 is executed again.

In step 112, in order to complete the preoperation, a stop command is issued to set the target rotational speed to 0. Note that if an operation request has been already sent during the preparation for the operation of the electric oil pump 10, the target rotational speed might be immediately set to a requested value so as to smoothly supply the oil instead of setting the target rotational speed to 0 in this step.

In step 113, it is determined that the preoperation is completed and the preoperation completion flag is set (for example, switched from 0 to 1). By setting the preoperation completion flag, electric oil pump 10 is allowed to start general operation. Thus, the idle reduction and starting of the vehicle are permitted as well.

In step 114, the preoperation mode is shifted to the protection mode that limits the restart. Limiting the restart is executed by stopping the current supply to the electric oil pump 10.

To give another way to limit the restart, the following processing can be performed so as to prevent burn out of clutch 4 to which the cooling/lubricating oil discharged from electric oil pump 10 is to be supplied. That is, the target rotational speed for electric oil pump 10 is set lower than the first preoperation rotational speed RS1 to rotate the pump so that the actual current is kept at the level that does not impair heat resistance of electric oil pump 10, for example, the level that does not raise the temperature in each part of electric oil pump 10 compared to the current one. In this case, as the oil temperature measured by the oil temperature sensor 30 rises, the target rotational speed for electric oil pump 10 might be gradually or stepwise increased up to the first preoperation rotational speed RS1.

In step 115, it is determined whether a condition for cancelling the protection mode to return to the preoperation mode is satisfied.

The protection mode cancelling condition implies that the oil viscosity in intake pipe 11 and discharge pipe 12 is supposedly reduced due to the oil temperature rise that occurs with the heat generation etc. in engine 1 to thereby lower the load on electric oil pump 10 down to the level at least enough to resume the preoperation mode, such as the condition that a predetermined time passes after the preoperation mode is shifted to the protection mode, the condition that the oil temperature measured by oil temperature sensor 30 is raised by a predetermined temperature, or the combination thereof.

The predetermined time or predetermined temperature as criteria for determining whether the protection mode cancelling condition is satisfied can be defined based on the measured or estimated temperature of clutch 4. For example, as the temperature of clutch 4 lowers, the temperature difference between the actual temperature and the allowable temperature increases in clutch 4. Hence, the predetermined time might be set long and the predetermined temperature might be set high. Meanwhile, as the temperature of clutch 4 increases, the temperature difference between the actual temperature and the allowable temperature decreases in clutch 4, the predetermined time might be set short and the predetermined temperature might be set low.

The temperature of clutch 4 is estimated based on, for example, the oil temperature measured by the oil temperature sensor 30, the actual rotational speed of motor M, the input torque to clutch 4, a rotational speed difference between the input shaft and the output shaft of clutch 4, and so on. Then, the oil flow rate is calculated from the oil temperature and the actual rotational speed of motor M, whereby the radiation amount is calculated. The amount of heat generation is calculated from the input torque and the rotational speed difference of clutch 4. The temperature of clutch 4 is estimated based on the calculated heat generation amount and radiation amount, and the previous estimated temperature of clutch 4. When the temperature for clutch 4 is estimated first, the oil temperature measured by oil temperature sensor 30 might be used as the previous estimated temperature of clutch 4.

If electric oil pump 10 is applied to an electric-powered vehicle, unlike the idling mode in which engine 1 is used as a vehicle drive source, clutch 4 is not operating, and the temperature of clutch 4 and the oil temperature hardly increase. Thus, the protection mode cancelling condition can be set such that the temperature of the component of electric oil pump 10 is lowered down to the level enough to restart the preoperation mode and kept at the level for a predetermined time.

In step 115, it is determined that the protection mode cancelling condition is satisfied, the processing returns to step 101 (Yes). On the other hand, if it is determined that the protection mode cancelling condition is not satisfied, the processing returns to step 114 so as to continue the protection mode (No).

According to the first embodiment, the restart of electric oil pump 10 is limited based on the number of restarts as a kind of information on the operation history of electric oil pump 10. Accordingly, the number of times the restart is repeated is reduced and thus, power consumption is saved. In addition, reduction in heat resistance (service life) of the electric oil pump can be suppressed.

In particular, if motor M for driving electric oil pump 10 is operated in a sensorless manner, i.e., without any positional sensor, it is necessary to perform positioning control on rotor R so as to identify the initial position thereof along with the restart. However, during this positioning control on the rotor, current flows in a large amount that cannot be ignored in view of power saving and thermal protection of electric oil pump 10, even compared to general sensorless control during the rotational operation. Therefore, it is effective to limit the restart by control unit 20.

In addition, even if the restart is limited and the protection mode is implemented, when the protection mode cancelling condition is satisfied, i.e., when it is presumed that the load on electric oil pump 10 is lowered down to a level enough to restart the preoperation mode, the pump automatically returns to the preoperation mode. Therefore, the preoperation can be efficiently performed taking into consideration the thermal protection of electric oil pump 10.

Next, a second embodiment of the present invention is described. Note that the same components as in the first embodiment are indicated by the same reference numerals or symbols and the description thereof is omitted or simplified.

Figure 7:
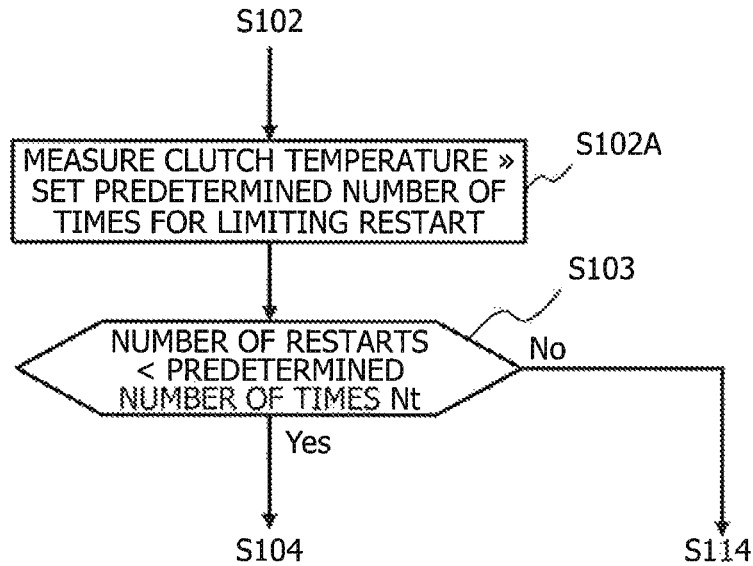
FIG. 7 is a flowchart of processing added to the preoperation routine illustrated in FIG. 4, according to a second embodiment of the present invention.

FIG. 7 is a flowchart of processing added to the preoperation routine of the first embodiment (see FIG. 4). More specifically, step 102A is added between step 102 for setting the target rotational speed to the first preoperation rotational speed RS1 and step 103 for determining whether the number of restarts is less than the predetermined number of times Nt.

In step 102A, the predetermined number of times Nt is set. This value is used as a criterion for determination in step 103 as to whether to limit the restart, that is, implement the protection mode, which is performed in step 114, based on the temperature of clutch 4 to be cooled/lubricated with the oil discharged from electric oil pump 10.

As the temperature of clutch 4 decreases, the temperature difference between the actual temperature of clutch 4 and the allowable level increases, thereby lowering the necessity for cooling/lubricating clutch 4. If the temperature of clutch 4 is lowered, the predetermined number of times Nt is reduced to impose more strict condition for limiting the repeated restarts. In contrast, as the temperature of clutch 4 increases, the temperature difference between the actual temperature of clutch 4 and the allowable level is reduced, thereby increasing the necessity for cooling/lubricating clutch 4. When the temperature of clutch 4 rises, the predetermined number of times Nt may be increased to ease the condition for limiting the repeated restarts. Note that the temperature of clutch 4 may be either measured or estimated as described above.

If electric oil pump 10 is applied to an electric-powered vehicle, unlike the idling mode in which engine 1 is used as a vehicle drive source, clutch 4 is not operating, and the temperature of clutch 4 hardly increases. Thus, this step can be omitted.

According to the aforementioned second embodiment, as the necessity for cooling/lubricating clutch 4 increases, the priority of thermal protection of electric oil pump 10 is lowered, thereby avoiding a situation that the vehicle drive performance is lost or lowered due to the burn-out of clutch 4 etc. Meanwhile, as the necessity for cooling/lubricating clutch 4 decreases, the higher priority may be given to thermal protection of electric oil pump 10. Therefore, it is possible to ensure thermal protection of electric oil pump 10 while maintaining the high vehicle drive performance.

Next, a third embodiment of the present invention is described. Note that the same components as in the first embodiment are indicated by the same reference numerals or symbols and the description thereof is omitted or simplified.

Figure 8:
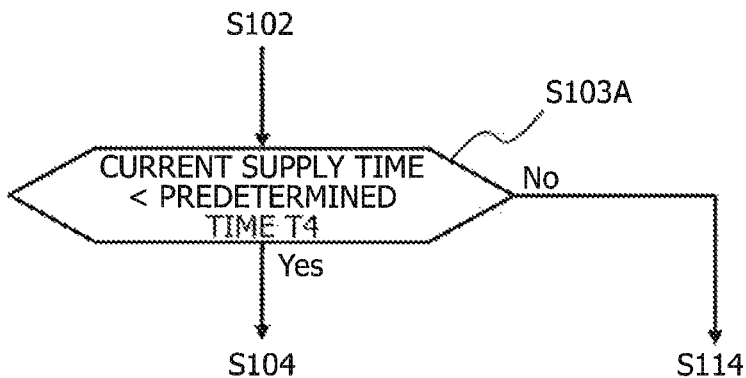
FIG. 8 is a flowchart of partially changed processing in the preoperation routine illustrated in FIG. 4, according to a third embodiment of the present invention.

FIG. 8 is a flowchart of partially replaced processing in the preoperation routine of the first embodiment (see FIG. 4). More specifically, step 103 for determining whether the number of restarts is less than the predetermined number of times Nt is replaced by step 103A.

In step 103A, it is determined whether the period in which current is supplied to electric oil pump 10 exceeds the predetermined time T4 during the preoperation for electric oil pump 10. The current supply period is a kind of information on the current history out of the operation history of electric oil pump 10. Here, the predetermined time T4 refers to the current supply time during which the temperature of the component of electric oil pump 10 actually or presumably reaches the allowable temperature.

If motor M for driving electric oil pump 10 is operated in a sensorless manner, i.e., without any positional sensor, the current supply time includes the time necessary for positioning control to identify the initial position of rotor R.

In step 103A, if it is determined that the current supply time for electric oil pump 10 is shorter than the predetermined time T4, the processing advances to step 104 to determine whether the actual rotational speed is equal to or higher than the target rotational speed RS1 (Yes). On the other hand, if it is determined that the current supply time is equal to or longer than the predetermined time T4, the processing advances to step 114 to limit the restart and implement the protection mode (No).

According to the aforementioned third embodiment, the restart can be limited based on the current supply time as a kind of information on the current history that reflects the heat generation in electric oil pump 10. Thus, at the time of determining whether to limit the restart from the viewpoint of thermal protection of electric oil pump 10, the determination accuracy can become higher than in step 103 for determining whether to limit the restart based on the number of restarts.

Note that in the third embodiment, it is determined whether to limit the restart based on the current supply time for electric oil pump 10. However, if the current is continuously supplied to electric oil pump 10 throughout the preoperation period that corresponds to the elapsed time from when the preoperation starts, it is possible to determine whether to limit the restart based on the preoperation period instead of the current supply time. In this case as well, the same advantageous effects as the third embodiment can be obtained.

Next, a fourth embodiment of the present invention is described. Note that the same components as in the first embodiment are indicated by the same reference numerals or symbols and the description thereof is omitted or simplified.

Figure 9:
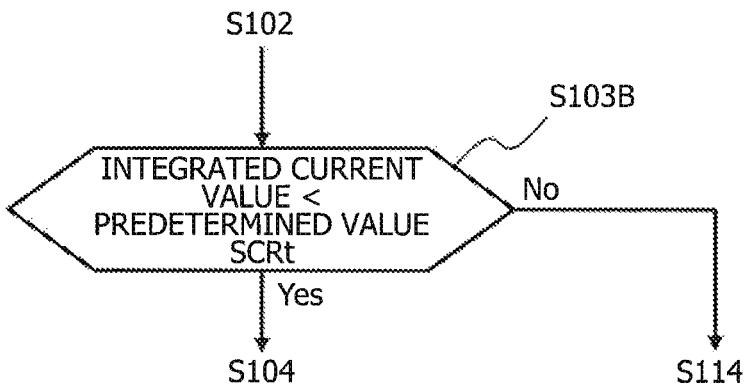
FIG. 9 is a flowchart of partially changed processing in the preoperation routine illustrated in FIG. 4, according to a fourth embodiment of the present invention.

FIG. 9 is a flowchart of partially replaced processing in the preoperation routine of the first embodiment (see FIG. 4). More specifically, step 103 for determining whether the number of restarts is less than the predetermined number of times Nt is replaced by step 103B.

In step 103B, during the preoperation for electric oil pump 10, it is determined whether the integrated current value indicating the integrated value of current amounts supplied to electric oil pump 10 is less than the predetermined value SCRt. The integrated current value corresponds to the current history out of the operation history of electric oil pump 10. Here, the predetermined value SCRt corresponds to the integrated current value at which it is determined or presumed that the temperature of the component of electric oil pump 10 reaches an allowable temperature.

Especially, if motor M for driving electric oil pump 10 is operated in a sensorless manner, i.e., without any positional sensor, it is necessary to integrate as the integrated current value, the current required for positioning control on rotor R so as to identify the initial position thereof along with the restart.

According to the aforementioned fourth embodiment, it is determined whether to limit the restart based on the integrated current value calculated from not only the current supply time as a kind of information on the current history that reflects the amount of heat generation in electric oil pump 10 but also a current value as another kind of information on the history, that is, the amount of heat generation that occurs with current supply. On this account, it is possible to enhance the accuracy of determination as to whether to limit the restart from the viewpoint of thermal protection of electric oil pump 10, compared to the determination in step 103A which is made based on the current supply time.

Note that the three steps, i.e., steps 103, 103A, and 103B for the processing of determining whether to limit the restart as described in the above embodiments can be incorporated, in any combination, in the preoperation routine for electric oil pump 10. In this case, if it is determined that the restart has to be limited in one or all of the steps incorporated in any combination, the preoperation mode can be shifted to the protection mode.

For example, when the processing of determining whether to limit the restart is performed in steps 103, 103A, and 103B this order after step 102, if it is determined that the restart has to be limited in one or all of steps 103, 103A, and 103B, the preoperation mode can be shifted to the protection mode. As a result, it is possible to enhance the accuracy of determination as to whether to limit the restart from the viewpoint of thermal protection of electric oil pump 10, compared to the determination as to whether to limit the restart based on one criterion such as the number of restarts.

Furthermore, in the second embodiment, determined in step 102A is the predetermined number of times Nt as the criterion for determination as to whether to limit the restart based on the measured or estimated temperature of clutch 4. In the third embodiment, however, it is possible to set the predetermined time T4 as the criterion for determination as to whether to limit the restart based on the temperature of clutch 4.

For example, as the temperature of clutch 4 decreases, the temperature difference between the actual temperature of clutch 4 and the allowable level increases and thus, the necessity for cooling/lubricating clutch 4 is lowered. Therefore, if the temperature of clutch 4 decreases, the predetermined time T4 is increased so as to ease the conditions for limiting the repeated restarts. In contrast, as the temperature of clutch 4 increases, the temperature difference between the actual temperature of clutch 4 and the allowable level decreases and thus, the necessity for cooling/lubricating clutch 4 increases. Therefore, if the temperature of clutch 4 increases, the predetermined time T4 can be shortened so as to impose more strict conditions for limiting the repeated restarts.

Likewise, it is possible to set the predetermined value SCRt as the criterion for determination as to whether to limit the restart in the fourth embodiment, based on the temperature of clutch 4.

For example, if the temperature of clutch 4 decreases, the predetermined value SCRt increases so as to ease the conditions for limiting the repeated restarts. In contrast, if the temperature of clutch 4 increases, the predetermined value SCRt can be decreased so as to impose more strict conditions for limiting the repeated restarts.

Next, the conditions for implementing the control on the above preoperation, etc. are described in more detail.

When the power supply voltage falls below the predetermined value at the time of issuing a drive request for the preoperation for electric oil pump 10 or during the driving, the driving is stopped or limited. At this time, if the outside temperature or the like is low, a threshold for the power supply voltage may be increased, taking the battery characteristics into consideration.

That is, the power supply of this system is generally used for starting the engine as well. If expected that the next start of the engine is hard to execute, the driving of the engine is stopped. This is because, especially during the idle reduction mode, the engine is generally restarted thereafter, but the restart is hard to execute in such a circumstance. Since power is supplied from an alternator during the engine rotation, and the depth of discharge is remarkably large, for example, at the low-temperature startup, the battery state cannot be easily checked in many cases. Thus, if the determination is made based on the voltage state after the idle reduction mode, the battery state can be appropriately checked.

If some device or unit that is supplied with power from electric oil pump 10 makes stringent requirements, for example, in urgent cases, the pump is driven by bypassing or easing the operation-permission conditions of electric oil pump 10. In this case, the determination on the abnormality in work-load relations (e.g., relation between current and supply amount) is performed under the eased conditions or cancelled.

That is, in a case of heavy-load start, such as hill start of a vehicle in tow under a very low temperature, even if the outside temperature, the oil temperature, and the like are low, start clutch may raise its temperature to a dangerous level. In such cases, the drive is performed by bypassing or easing the conditions. On this occasion, it is more likely that the determination on general work-load relations may result in abnormal values due to high-viscosity oil, friction at each part, and the like. In view of this, the determination is performed under the eased conditions (e.g., threshold for determination may be changed) or cancelled.

Note that the illustrated embodiments merely demonstrate the present invention. As is needless to say, the present invention encompasses not only the aforementioned exemplary embodiments but also various modifications and changes conceivable by the one skilled in the art within the scope of claims.

For example, in the illustrated embodiments, electric oil pump 10 supplies the cooling/lubricating oil to clutch 4 out of transmission 3, but the present invention is not limited thereto. The pump can supply oil as a hydraulic oil to at least a part of transmission 3 instead.

Furthermore, in the illustrated embodiments, the pipes of mechanical oil pump 7 and electric oil pump 10 on the discharge side are provided as completely separate pathways. However, they may be provided to join each other with check valves, etc. being inserted to prevent backflow. Note that, in this case, it is necessary to set the rotational speed so that a discharge pressure of electric oil pump 10 exceeds opening-valve pressures at the check valves, etc.

REFERENCE SYMBOL LIST

1 Engine
2 Torque converter
3 Transmission
4 Clutch
4H Housing
5 Continuously variable transmission unit
5a Primary pulley
5b Secondary pulley
5c Belt
6 Oil pan
7 Mechanical oil pump
8 Pressure adjusting mechanism
10 Electric oil pump (M: motor, INV: inverter)
11 Intake pipe
12 Discharge pipe
13 Oil inlet
20 Control unit
21 Current detection resistor
22 Detector
30 Oil temperature sensor

The invention claimed is:

1. A controller for an electric oil pump which is provided in parallel to a mechanical oil pump driven by an internal combustion engine as a power source of a vehicle to supply oil to a transmission for the vehicle, and which is configured to supply oil to at least a part of the transmission, the controller comprising:

a microcomputer, wherein the microcomputer is configured to implement a determination mode in which the electric oil pump is rotated at a second preoperation rotational speed in advance of a request to operate the electric oil pump, and at least when an actual rotational speed matches a second predetermined rotational speed not higher than the second preoperation rotational speed, it is determined that preoperation for the electric oil pump is completed, the microcomputer is configured to implement a preoperation mode in which, under at least one condition that it is not yet determined that preoperation for the electric oil pump is completed, the electric oil pump is rotated at a first preoperation rotational speed that is lower than the second preoperation rotational speed and the second predetermined rotational speed, and also configured to shift the preoperation mode to the determination mode when the actual rotational speed matches the first preoperation rotational speed and an actual current matches a predetermined threshold, and microcomputer is configured to limit restart of the electric oil pump when an integrated current value as an integrated value of current amounts supplied to the electric oil pump matches a value at which a temperature of a component of the electric oil pump reaches an allowable temperature.

2. The controller for the electric oil pump according to claim 1, wherein the microcomputer is configured to ease limitation on restart of the electric oil pump when an oil temperature of the oil is increased by a predetermined temperature after the restart of the electric oil pump is limited.

3. The controller for the electric oil pump according to claim 2, wherein the predetermined temperature is set according to a temperature of the at least the part of the transmission.

4. The controller for the electric oil pump according to claim 1, wherein the microcomputer is configured to ease limitation on restart of the electric oil pump when a predetermined time has elapsed after the restart of the electric oil pump is limited.

5. The controller for the electric oil pump according to claim 4, wherein the predetermined time is set according to a temperature of the at least the part of the transmission.

6. The controller for the electric oil pump according to claim 1, wherein the microcomputer is configured to limit restart of the electric oil pump based on a current supply time corresponding to the time for supplying current to the electric oil pump.

7. The controller for the electric oil pump according to claim 1, wherein the microcomputer is configured to limit restart of the electric oil pump based on a preoperation time required for the determination mode and the preoperation mode.

8. A controller for an electric oil pump which is provided in parallel to a mechanical oil pump driven by an internal combustion engine as a power source of a vehicle to supply oil to a transmission for the vehicle, and which is configured to supply oil to at least a part of the transmission, the controller comprising:

a microcomputer, wherein
the microcomputer is configured to implement a determination mode in which the electric oil pump is rotated at a second preoperation rotational speed in advance of a request to operate the electric oil pump, and at least when an actual rotational speed matches a second predetermined rotational speed not higher than the second preoperation rotational speed, it is determined that preoperation for the electric oil pump is completed, the microcomputer is configured to implement a preoperation mode in which, under at least one condition that it is not yet determined that preoperation for the electric oil pump is completed, the electric oil pump is rotated at a first preoperation rotational speed that is lower than the second preoperation rotational speed and the second predetermined rotational speed, and also configured to shift the preoperation mode to the determination mode when the actual rotational speed matches the first preoperation rotational speed and an actual current matches a predetermined threshold, and the microcomputer is configured to limit restart of the electric oil pump based on a result of comparing a number of restarts of the electric oil pump with a predetermined number of times, and the predetermined number of times is set based on a temperature of the at least the part of the transmission.

9. The controller for the electric oil pump according to claim 8, wherein the predetermined number of times decreases when the temperature of the at least the part of the transmission increases, whereas the predetermined number of times increases when the temperature of the at least the part of the transmission decreases.

10. The controller for the electric oil pump according to claim 8, wherein the microcomputer is configured to ease limitation on restart of the electric oil pump when an oil temperature of the oil is increased by a predetermined temperature after the restart of the electric oil pump is limited.

11. The controller for the electric oil pump according to claim 10, wherein the predetermined temperature is set according to a temperature of the at least the part of the transmission.

12. The controller for the electric oil pump according to claim 8, wherein the microcomputer is configured to ease limitation on restart of the electric oil pump when a predetermined time has elapsed after the restart of the electric oil pump is limited.

13. The controller for the electric oil pump according to claim 12, wherein the predetermined time is set according to a temperature of the at least the part of the transmission.

14. A control method for an electric oil pump which is provided in parallel to a mechanical oil pump driven by an internal combustion engine as a power source of a vehicle to supply oil to a transmission for the vehicle, and which is configured to supply oil to at least a part of the transmission, the method comprising, under control of a control unit, the steps of:

implementing a determination mode in which the electric oil pump is rotated at a second preoperation rotational speed in advance of a request to operate the electric oil pump, and at least when an actual rotational speed matches a second predetermined rotational speed not higher than the second preoperation rotational speed, it is determined that preoperation for the electric oil pump is completed;

implementing a preoperation mode in which, under at least one condition that it is not yet determined that preoperation for the electric oil pump is completed, the electric oil pump is rotated at a first preoperation rotational speed that is lower than the second preoperation rotational speed and the second predetermined rotational speed, and also shifting the preoperation mode to the determination mode when the actual rotational speed matches the first preoperation rotational speed and an actual current matches a predetermined threshold; and limiting, in the preoperation mode, restart of the electric oil pump when an integrated current value as an integrated value of current amounts supplied to the electric oil pump matches a value at which a temperature of a component of the electric oil pump reaches an allowable temperature.

15. A control method for an electric oil pump which is provided in parallel to a mechanical oil pump driven by an internal combustion engine as a power source of a vehicle to supply oil to a transmission for the vehicle, and which is configured to supply oil to at least a part of the transmission, the method comprising, under control of a control unit, the steps of:

implementing a determination mode in which the electric oil pump is rotated at a second preoperation rotational speed in advance of a request to operate the electric oil pump, and at least when an actual rotational speed matches a second predetermined rotational speed not higher than the second preoperation rotational speed, it is determined that preoperation for the electric oil pump is completed;

implementing a preoperation mode in which, under at least one condition that it is not yet determined that preoperation for the electric oil pump is completed, the electric oil pump is rotated at a first preoperation rotational speed that is lower than the second preoperation rotational speed and the second predetermined rotational speed, and also shifting the preoperation mode to the determination mode when the actual rotational speed matches the first preoperation rotational speed and an actual current matches a predetermined threshold; and limiting, in the preoperation mode, the restart of the electric oil pump based on a result of comparing a number of restarts with a predetermined number of times, which is set based on a temperature of the at least the part of the transmission.

* * * * *